(Model.)
H. E. FINNEY.
DEVICE FOR MEDICAL TREATMENT OF THE MALE URINARY ORGANS.
No. 281,043. Patented July 10, 1883.
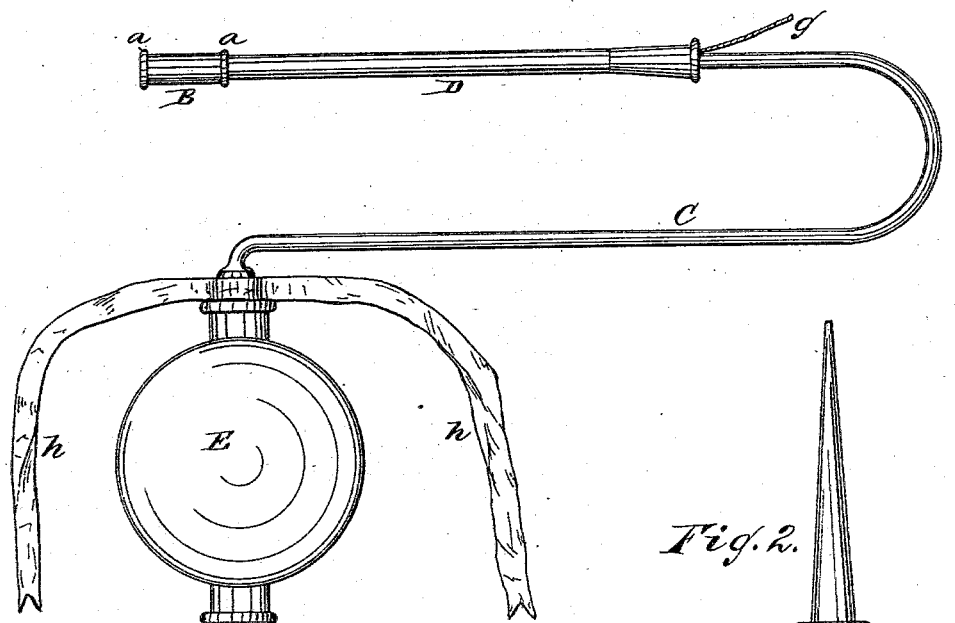
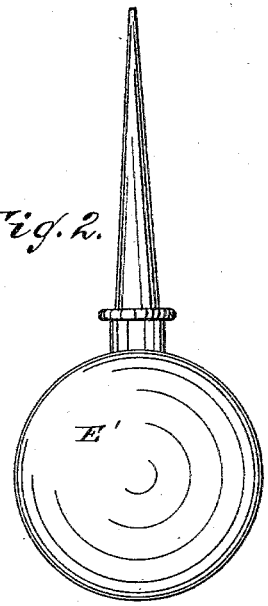
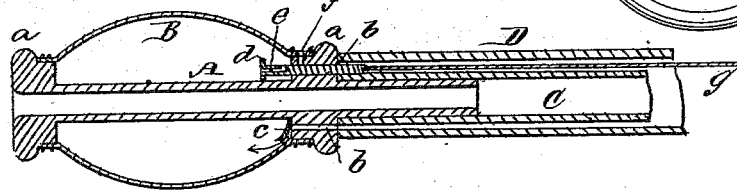
WITNESSES:
INVENTOR:
H. E. Finney
BY
ATTORNEYS.

UNITED STATES PATENT OFFICE.

HENRY E. FINNEY, OF LAS VEGAS, TERRITORY OF NEW MEXICO.

DEVICE FOR MEDICAL TREATMENT OF THE MALE URINARY ORGANS.

SPECIFICATION forming part of Letters Patent No. 281,043, dated July 10, 1883.

Application filed May 25, 1882. (Model.)

*To all whom it may concern:*

Be it known that I, HENRY E. FINNEY, of Las Vegas, in the county of San Miguel and Territory of New Mexico, have invented a new and useful Improvement in Devices for Medical Treatment of the Male Urinary Organs, of which the following is a full, clear, and exact description.

This invention consists in a device which is designed to be inserted within the penis, as a bougie or catheter is passed up the urethra; but it differs from these devices in several important particulars, and is provided at its inner end with a flexible hollow retainer, through which a close passage is made for carrying off the urine or other discharge, and has combined with it means for inflating said retainer or of contracting it at pleasure from the exterior, and for injection and other purposes.

The object of the invention is mainly to prevent passage of the urine from irritating any diseased part of the urinary canal, and to provide for the injection therein of healing-liquids.

Reference is to be had to the accompanying drawings, forming part of this specification, in which similar letters of reference indicate corresponding parts in all the figures.

Figure 1 represents a side view of the device as ready for use, but prior to insertion and inflation of the flexible retainer. Fig. 2 is a view of a flow-pipe contrivance that may be used in connection with the device; and Fig. 3, a longitudinal section, upon a larger scale, of the flexible retainer and certain tubes and parts connected with it.

A in the drawings is a tube of metal, gutta-percha, or other suitable material, open at both of its ends. Around the middle or rear portion of this tube, between enlarged collars or heads $a\ a$ on it, is the flexible retainer B, which may be made of rubber or other elastic or flexible material. A mere rubber band, made air-tight at the junction of its ends or edges with the heads $a\ a$, will answer the purpose. The front one of these heads $a\ a$ has two longitudinal holes, $b\ b$, through it, establishing communication between the interior of the retainer B and the outside of the front portion of the tube A, or of a rubber tube, C, fitted thereon. The one of these holes $b\ b$ is closed by a valve, $c$, opening inward within the front end of the retainer, and the other of said holes contains a sliding rod or other valve, $d$, having in its rear end a bent passage, $e$, which, when the rod is slid outward, communicates with a transverse hole or opening, $f$, in the front head $a$, extending through the device on its one side; but when said rod is pushed inward, as represented in Fig. 3, all communication through it between the exterior of the device and the interior of the retainer is shut off. The inner end of said rod $d$ is enlarged to form a stop to prevent the rod or valve $d$ from being drawn wholly out and to bring its passage $e$ in line, when drawn out, with the opening $f$. Attached to the front end of said valve $d$ is a silk or other cord, $g$, for drawing it out. This cord may be run any desired length outside of the tube C and between it and a short exterior tube, D, that may be made of or coated with any suitable non-corrosive material. The flexible tube C is extended and connected at its outer end with an elastic blower or rubber air-pump, E, that may be provided with tapes $h\ h$, the use of which will be hereinafter described. This blower serves to inflate the flexible retainer B with air delivered by it through the valve $c$ when the valve $d$ is closed, as shown in Fig. 3; or it may be used to inject a medicated or other liquid, and the valve $d$ afterward be drawn out or opened to distribute the same to the exterior of the device for soothing or healing irritated parts of the urethra. This, however, is not the primary use of the valve $d$.

Instead of the elastic air-pump E, a pointed blower or blow-pipe, E', having an elastic ball or bulb on its back end, may be used by inserting the point of the blow-pipe in the outer end or mouth of the tube D, outside of the tube C.

In using the instrument, the portion of the device carrying the flexible retainer B is inserted within the penis far enough to reach beyond the most irritated part, and held in place by inflating the retainer B with air. Urine may then be passed without irritating or coming in contact with the diseased parts of the canal; or medicated liquids may be injected, as described, inside the urethra and around or outside of the device. When necessary to reduce the expansion of the flexible retainer B, the valve $d$ is drawn out by the cord $g$, to establish communication between said retainer and the exterior of the device. The escape of air thus produced will cause the flexible retainer B to collapse, which will permit of the removal of the device from out of the penis.

The device may be used wholly as a syringe, and repeated charges of medicated liquid be introduced into the penis by gently pressing on the elastic ball or blower E; and in some cases the outer tube, D, be removed from the device.

$h$ $h$ represent tapes, by means of which the device may be temporarily secured to the person of the patient.

In some cases, where it would be painful to insert the device, the blower E and tube C may be attached before introducing the device, and then as or during the insertion of it a gentle pressure be exerted on the ball or blower E, which, by its inflation of the retainer B, will expand the urinary canal, and so reduce the pain of insertion. By working the instrument as a syringe, after it has been removed from the person it may be readily cleaned, or its parts may be detached for the purpose. The hole in the head $a$, in which sits the valve $d$, may be enlarged for a portion of its length in front, so that when the valve $d$ is drawn outward by the cord $g$ air may escape along said hole from the retainer B into the tube D, instead of through the aperture $f$.

Having thus fully described my invention, I claim as new and desire to secure by Letters Patent—

1. In a device for the passage of urine and for injecting medicated or other liquids therein, the combination, with a tube open at its opposite ends, of a flexible retainer applied to the middle or rear portion of the exterior of said tube, and provided with means for inflating or collapsing it from the exterior, substantially as specified.

2. The combination of the tube A, the flexible retainer B, and the valves $c$ and $d$, essentially as described.

3. The combination, with an elastic bulb, of the tubes C D A, flexible retainer B, and the valves $c$ $d$, substantially as described, and for the purpose set forth.

HENRY E. FINNEY.

Witnesses:
 L. LEITENSDORFER,
 W. R. WALKER.